United States Patent [19]

Tamamura et al.

[11] Patent Number: 5,479,228
[45] Date of Patent: Dec. 26, 1995

[54] CAMERA USING A FILM WITH A MAGNETIC MEMORY PORTION AND HAVING A CONTROL UNIT FOR CAUSING RECORDING OF PREDETERMINED DATA TOGETHER WITH THE ID FOR VOLUNTARILY SET DATA

[75] Inventors: Hideo Tamamura, Yokohama; Toru Nagata, Tokyo, both of Japan

[73] Assignee: Canon Kabushiki Kaisha, Tokyo, Japan

[21] Appl. No.: 193,644

[22] Filed: Feb. 7, 1994

Related U.S. Application Data

[63] Continuation of Ser. No. 826,492, Jan. 27, 1992, abandoned.

[30] Foreign Application Priority Data

Jan. 31, 1991 [JP] Japan .................................. 3-029064
Jan. 31, 1991 [JP] Japan .................................. 3-029068

[51] Int. Cl.[6] .................................................. G03B 17/24
[52] U.S. Cl. ...................................................... 354/106
[58] Field of Search ..................................... 354/105, 106

[56] References Cited

U.S. PATENT DOCUMENTS 4,864,332  9/1989  Harvey ................................ 354/105 X
5,006,873  4/1991  Wash ....................................... 354/106

FOREIGN PATENT DOCUMENTS

WO9004204  4/1990  WIPO.
WO9004254  4/1990  WIPO.

OTHER PUBLICATIONS

"Camerart" Sep. 1990, pp. 12–14, No Author.

*Primary Examiner*—Michael L. Gellner
*Assistant Examiner*—J. K. Han
*Attorney, Agent, or Firm*—Fitzpatrick, Cella, Harper & Scinto

[57] ABSTRACT

A camera using a film with a magnetic memory portion including a first data setting unit for setting data voluntarily set by a user, a recording unit for recording the voluntarily set data together with an ID for the voluntarily set data on the magnetic memory portion of the film, a second data setting unit for setting predetermined data other than the voluntarily set data, and a control unit for causing the recording unit to record the predetermined data together with the ID for the voluntarily set data on the magnetic memory portion of the film.

114 Claims, 10 Drawing Sheets

CAMERA USING A FILM WITH A MAGNETIC MEMORY PORTION AND HAVING A CONTROL UNIT FOR CAUSING RECORDING OF PREDETERMINED DATA TOGETHER WITH THE ID FOR VOLUNTARILY SET DATA

This application is a continuation of application Ser. No. 07/826,492 filed Jan. 27, 1992, now abandoned.

BACKGROUND OF THE INVENTION

1. Field of the Invention

The present invention relates to an improvement in a camera which writes information onto a magnetic memory portion of a film.

2. Description of the Related Art

U.S. Pat. No. 4,864,322 relates to a type of camera in which a film having a magnetic memory portion is used and information such as year, month, and day, shutter speed and aperture value can be written on or, if necessary, read from this magnetic memory portion by means of a magnetic head, or information written in advance such as the ISO and the specified number of film frames is read from the same.

Also, it is known that the various kinds of data, which are recorded on the magnetic memory portion as mentioned above, are imprinted together with an image such as a person's image, if desired, when the film is printed.

W.O. 90-04204 discloses a detailed way to record the magnetic information, using different kinds of indices, commonly known as IDs (IDENTIFICATIONS), corresponding to different kinds of magnetic information. W.O. 90-04254 discloses that end marks are attached after the respective magnetic information. "CAMERART SEPTEMBER 1990" discloses examples of the contents of the magnetic information and examples of the IDs.

As a practical matter, the kinds of IDs must be limited, because the information to be recorded on the magnetic memory portion of the film must be recorded on a very small space of the magnetic memory portion of the film.

Additionally, the kinds of IDs must be limited also because when the date recorded on the magnetic memory portion are imprinted, their printing positions and areas respectively occupy different specific spaces on the print.

However, there is a case where it is desired that the information with which the IDs are not associated are recorded on the magnetic memory portion of the film. In this case, user inputting data to be associated with an ID enables selected voluntary characters to be recorded on the magnetic memory portion of the film by means of a keyboard, for example, from outside of a camera. However, when time data is recorded on the magnetic memory portion of the film by the keyboard operation, the keyboard operation must be repeated whenever the time changes which is very inconvenient.

SUMMARY OF THE INVENTION

In view of the foregoing, it is an object of the invention to provide a camera using a film with a magnetic memory portion wherein various kinds of data can be recorded together with their respective IDs, comprising recording means for recording the various kinds of data together with their respective IDs, on the magnetic memory portion of the film, and control means for automatically regarding data having no ID as data inputted voluntarily from the outside of said camera by a user, and for causing said recording means to record the data having no ID together with ID indicating a storing area for the data inputted voluntarily from the outside of the camera by the user, thereby recording the data having no ID on the magnetic memory portion of the film in a more convenient manner.

Another object of the invention is to provide a recording apparatus for a camera using a film with a magnetic memory portion wherein various kinds of data can be recorded together with their respective IDs, comprising recording means for recording the various kinds of data together with the respective IDs on the magnetic memory portion of the film, and control means for automatically regarding data having no ID as data inputted voluntarily from the outside of said camera by a user, and for causing said recording means to record the data having no ID together with ID indicating a storing area for the data inputted voluntarily from the outside of said camera by the user, thereby recording the data having no ID on the magnetic memory portion of the film in a more convenient manner.

Other objects of the present invention will become apparent from the following description of the preferred embodiments of the present invention.

DETAILED DESCRIPTION OF THE PREFERRED EMBODIMENT

Embodiments of the present invention will be described with reference to the accompanying drawings.

Figure 1:
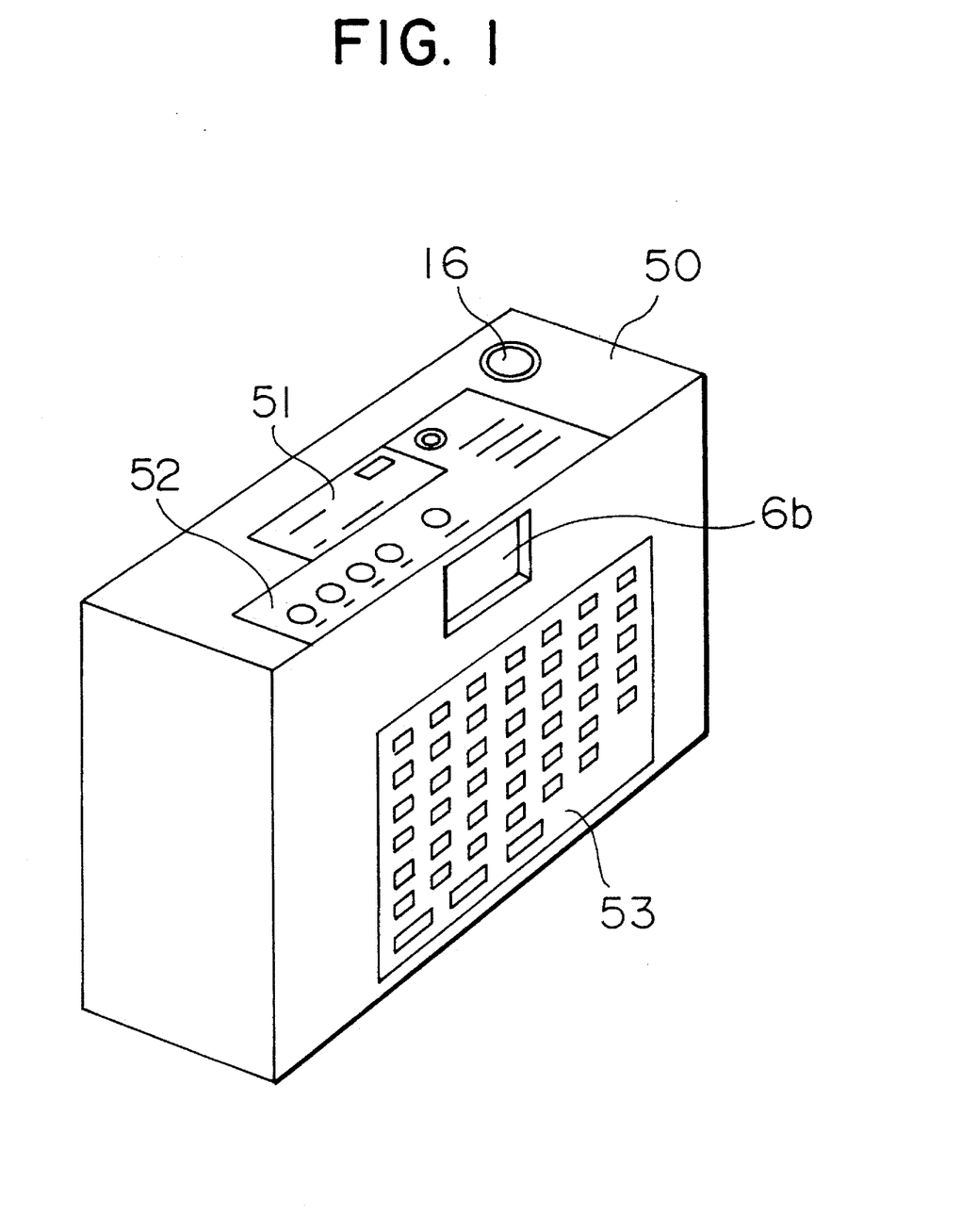
FIG. 1 is a perspective view of a camera in accordance with a preferred embodiment of the present invention.

FIG. 1 is a perspective view of a camera in accordance with a preferred embodiment of the present invention.

Referring to FIG. 1, reference numeral 16 denotes a release button; 6b, a finder; 50, a camera body; 51, a liquid crystal display (LCD); 52, an input operation panel for inputting a date, a message, etc; 53, a voluntary input operation panel.

The operation of LCD 51 by means of the voluntary input operation panel 53 will be described in detail with respect to FIGS. 6 and 7.

Figure 2:
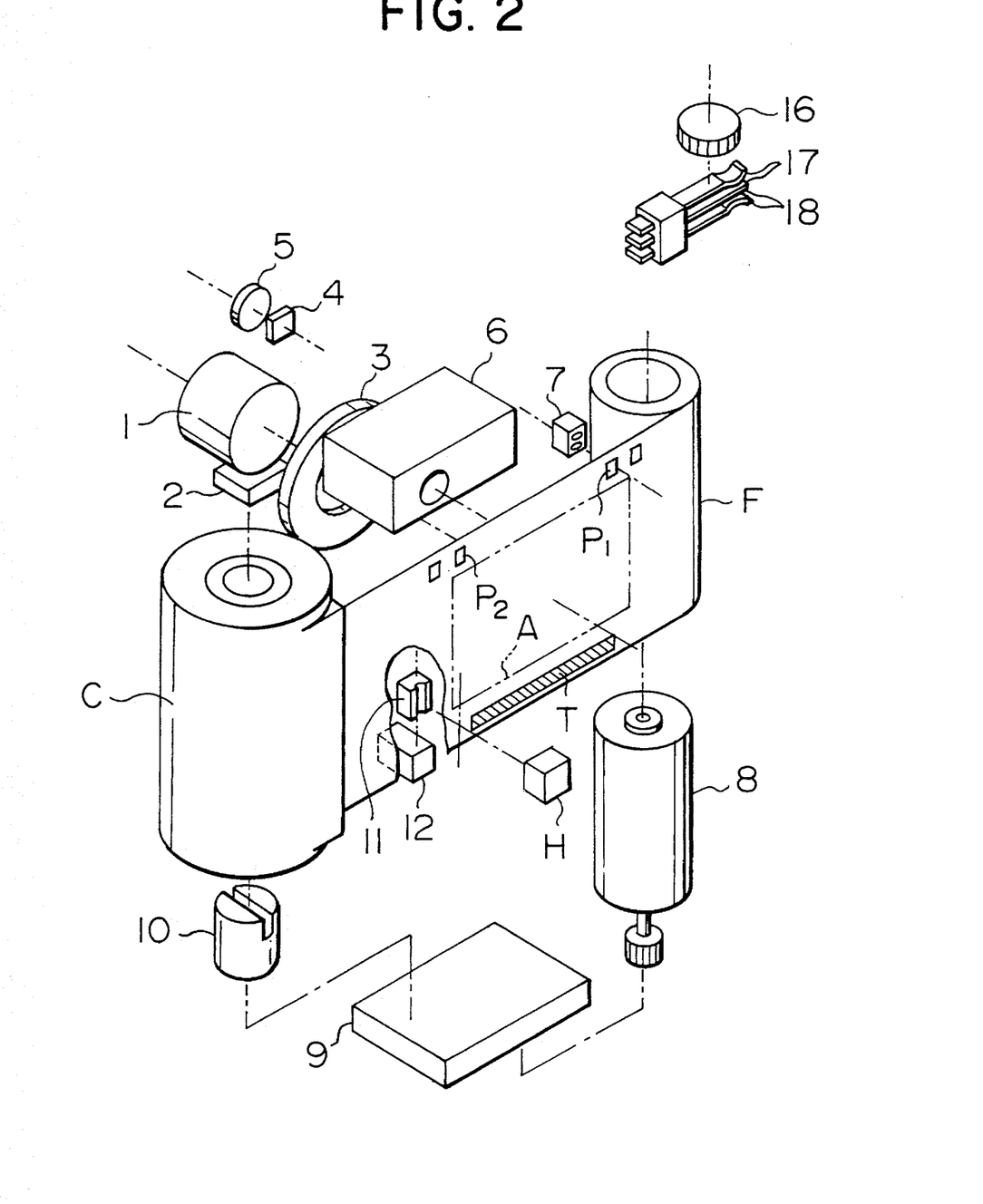
FIG. 2 is a perspective view of the internal construction of the essential parts of the camera shown in FIG. 1.

FIG. 2 is a perspective view of the internal construction of the essential parts of the camera.

Referring to FIG. 2, reference numeral 1 denotes a photographic lens; 2, a lens driving block including a lens actuator 2a (see FIG. 3) for driving the photographic lens 1 and a lens encoder 2b (see FIG. 3) for generating position signals of the photographic lens 1; 3, a lens shutter; 4, a photometry sensor for an AE operation 5, a lens for defining a light receiving angle of photometry sensor 4; 6, a block including a distance measuring sensor 6a to be described later with respect to FIG. 3; 7, a photoreflector generating signals for one frame transporting judgment of a film F to be described later in response to perforations P1 and P2 of the film F; 8, a film transporting motor provided within a spool; 9, a gear train for reducing a speed and also for changing over a winding operation and a rewinding operation of the film F; 10, a rewinding fork; C, a film cartridge receiving the film F in such a manner that the leader portion of the film F is out of the film cartridge C; F, the aforementioned film with a magnetic memory portion, i.e. a magnetic track T, located on a base side thereof; P1 and P2, the aforementioned perforations corresponding to a photographic frame A; H, a magnetic head for writing or reading information on or from magnetic track T; 11, a pad for pressing the film F on the magnetic head H and having a recess for improving the adherence between the film F and a head gap of the magnetic head H; 12, a pad movement control mechanism for making the pad 11 press the film F against the magnetic head H under a specified pressure only during a film transporting operation; 16, the release button shown in FIG. 1; 17, a switch SW1 for activating the photometry operation and the distance measuring operation; 18, a switch SW2 for starting the sequential operations of shutter opening and film transporting.

Figure 3:
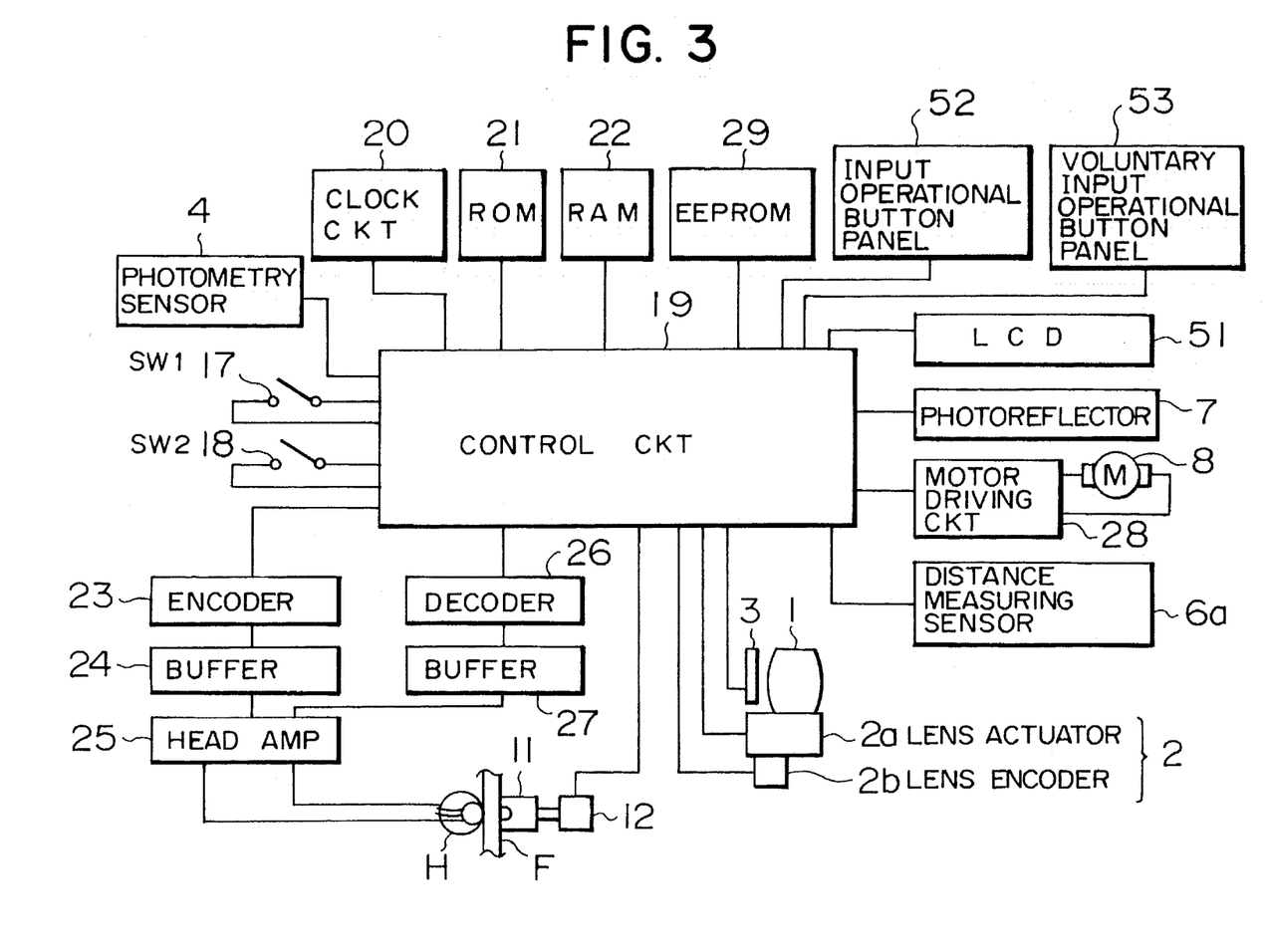
FIG. 3 is a circuit block diagram of the essential parts of the camera shown in FIG. 1.

FIG. 3 is a circuit block diagram of the essential parts of the camera. In FIG. 3 the identical parts or components as those shown in FIG. 1 and FIG. 2 are denoted by the same reference numerals, and a description thereof is omitted.

Referring to FIG. 3, reference numeral 19 denotes a control circuit comprising a microcomputer for controlling individual operations of the camera; 20, a well-known clock circuit; 21, a ROM for storing messages such as, "I LOVE YOU", "MERRY CHRISTMAS", etc., to be imprinted, which are predetermined; 22, a RAM for storing photographic information pertaining to a diaphragm, a shutter speed, an exposure compensation, etc., which is to be written on the magnetic memory portion of each frame of the film F; 23, an encoder; 24, a buffer; 25, a head amplifier; 26, a decoder; 27, a buffer; 28, a motor driving circuit for driving the film transporting motor 8; 29, an EEPROM for storing characters (alphabets, numerals, etc.) inputted by a user, which are to be written on the magnetic portion of each frame of the film F.

Figure 4:
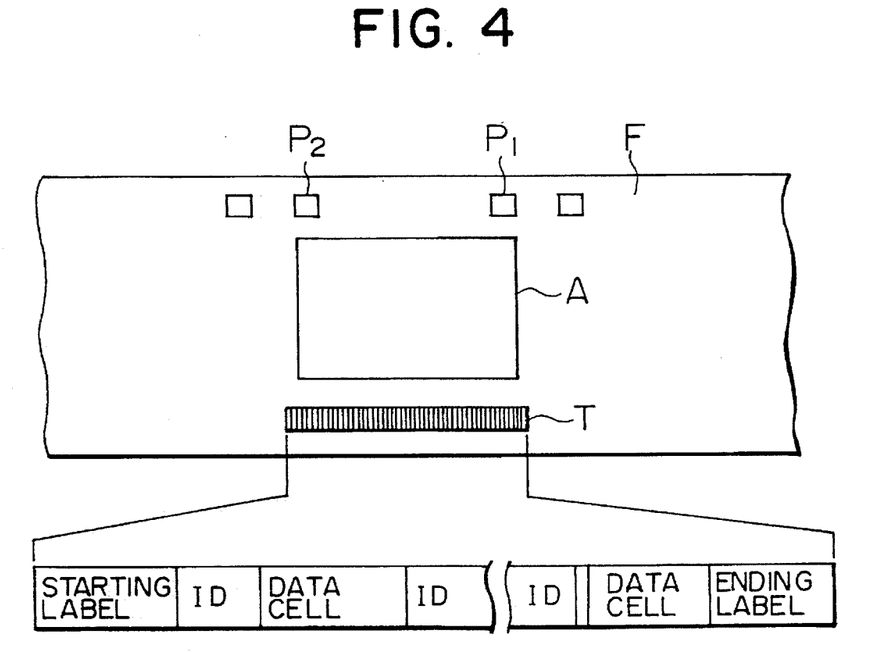
FIG. 4 is an explanatory diagram of a film with a magnetic memory portion which is used by the camera of the preferred embodiment.

FIG. 4 is a diagram showing details of the magnetic portion on one frame of the film F.

As shown in FIG. 4, a lower part of each frame (the photographing frame A) of the film F is provided with the magnetic portion T wherein a "STARTING LABEL" is at the head, an "ID", a "DATA CELL", an "ID", a "DATA CELL" . . . are provided in a row and an "ENDING LABEL" is provided at the tail.

Figure 5:
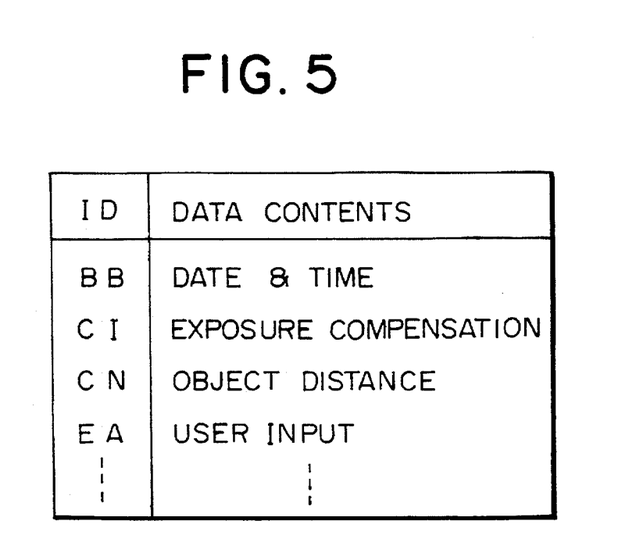
FIG. 5 is an explanatory diagram of IDs and their contents of the preferred embodiment.

FIG. 5 is an explanatory diagram of these respective IDs.

Referring to FIG. 5, for example, "BB" shows a storing area for date data, such as, "year, month and day" time data, such as, "hour, minute and second"; "CI", a storing area for the exposure compensation value; "CN", a storing area for an object distance; "EA" a storing area for the data inputted voluntarily from the outside of the camera by the user. And according to these IDs, when the film F is printed, some of these data (date, time, data inputted voluntarily by the user, etc.) are printed on the front surface of a print and others of these data (the exposure compensation value, the object distance data, etc.) are printed on the back surface of the print.

Other examples of the IDs and the contents of their data are shown in detail in an article from "CAMERART SEPTEMBER 1990" as noted above FIG. 6 shows the details of the LCD 51 and the input operation button panel 52 in FIG. 1. FIG. 7 shows the details of the voluntary input operation button panel 53 in FIG. 1.

Figure 6:
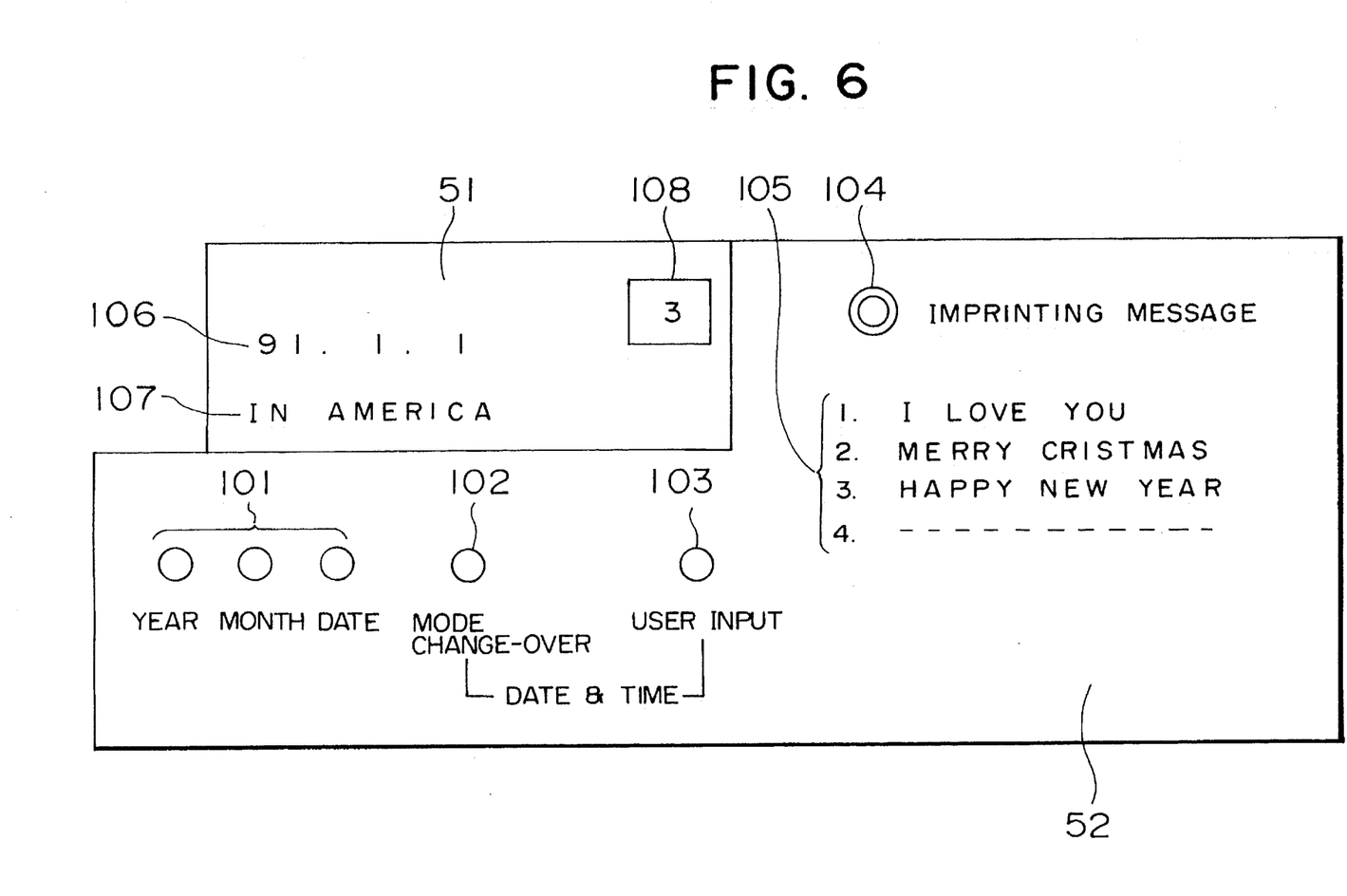
FIG. 6 is a plane view showing details of a liquid crystal display (LCD) and an input operation button panel shown in FIG. 1.
Figure 7:
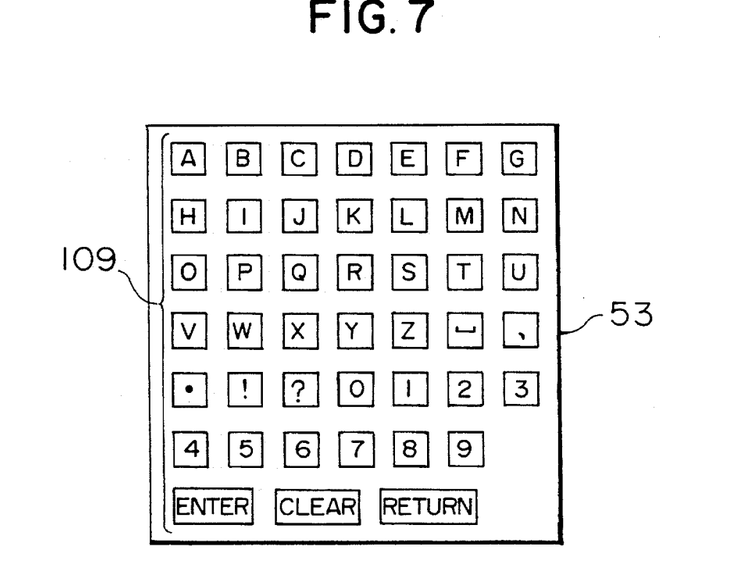
FIG. 7 is a plane view showing details of a voluntary input operation button panel shown in FIG. 1.

Referring to FIGS. 6 and 7, reference numeral 101 denotes a correcting button for correcting the date; 102, a mode changing button for changing "year, month and day" into "hour minute and second", or turning off the date/time information 103, a user input button wherein after this user input button is pressed, the characters of "IN AMERICA" shown on LCD 51, etc., can be inputted by pressing the corresponding voluntarily input buttons 109 in the voluntary input operation panel 53, and wherein if user input button 103 and the mode change button 102 are pressed simultaneously the date data of "year, month and day" (or "day, month and year") and the time data of "hour, minute and second" are both set as imprinting date and time data as will be described later.

Reference numeral 104 denotes a message selection button for selecting the imprinting message wherein whenever this message selection button is pressed, while a printed display portion 105 is being displayed, the imprinting messages are changed by turns as 1 ("I LOVE YOU")→2 ("MERRY CHRISTMAS")→3 ("HAPPY NEW YEAR")→4 (if the; imprinting message is cancelled, this number is selected.)→1 ("I LOVE YOU") and the selected message is shown on a display portion 107 and also indicated by number on a display portion 108 of the LCD 51.

Reference numeral 106 denotes a display portion for displaying one of the date data and the time data selected by the mode change button 102; reference numeral 107 denotes the display portion for displaying the imprinted characters inputted voluntarily from the outside of the camera by the user, etc.

Figure 8:
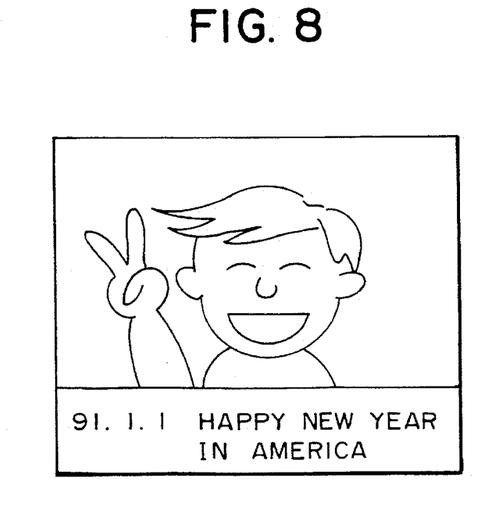
FIG. 8 is a diagram of an example showing a case where the film with data recorded magnetically is printed in relation to the camera of the preferred embodiment.

The number of the characters which can be displayed in the display portion 107 is limited, and so, for example, when "3" as the imprinting message as shown in FIG. 6 i.e. "HAPPY NEW YEAR" is selected and then after user input button is selected, "IN AMERICA" is inputted by the appropriate buttons 109 in the voluntary input operation panel 53 shown in FIG. 7, the display of "HAPPY NEW YEAR", which is inputted before, disappears and "IN AMERICA" which is inputted after that, is displayed. FIG. 8 shows an example of a print in which the imprinting characters are inputted in the foregoing manner.

When the imprinting messages such as the aforementioned "HAPPY NEW YEAR" and "IN AMERICA" are selected, "HAPPY NEW YEAR" of the imprinting message having no "ID" is automatically regarded as the data inputted voluntarily from the outside of the camera by the user, transformed into magnetic signals and written by the magnetic head H on the magnetic memory portion T of the film F after the "ID" indicating the storing area for the data inputted voluntarily from the outside of the camera by the user, i e "EA", together with "IN AMERICA" of the data inputted voluntarily from the outside of the camera in such a manner as to be "HAPPY NEW YEAR—start a new line —, IN AMERICA" during a film transporting operation.

Figure 9:
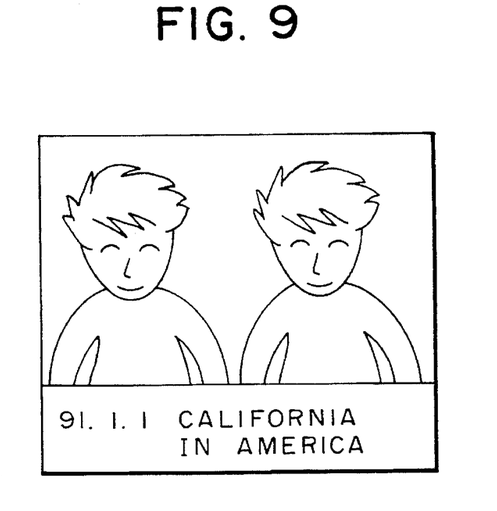
FIG. 9 is a diagram of another example showing a case where the film with data recorded magnetically is printed in relation to the camera of the embodiment.

In addition, FIG. 9 shows a state of a print in the case where "4" is selected by the message selection button 104 and then the user input button 103 is selected and all the characters composing the message "CALIFORNIA IN AMERICA" are inputted through buttons 109 in the voluntary input operation panel 53 shown in FIG. 7 by the user.

Figure 10:
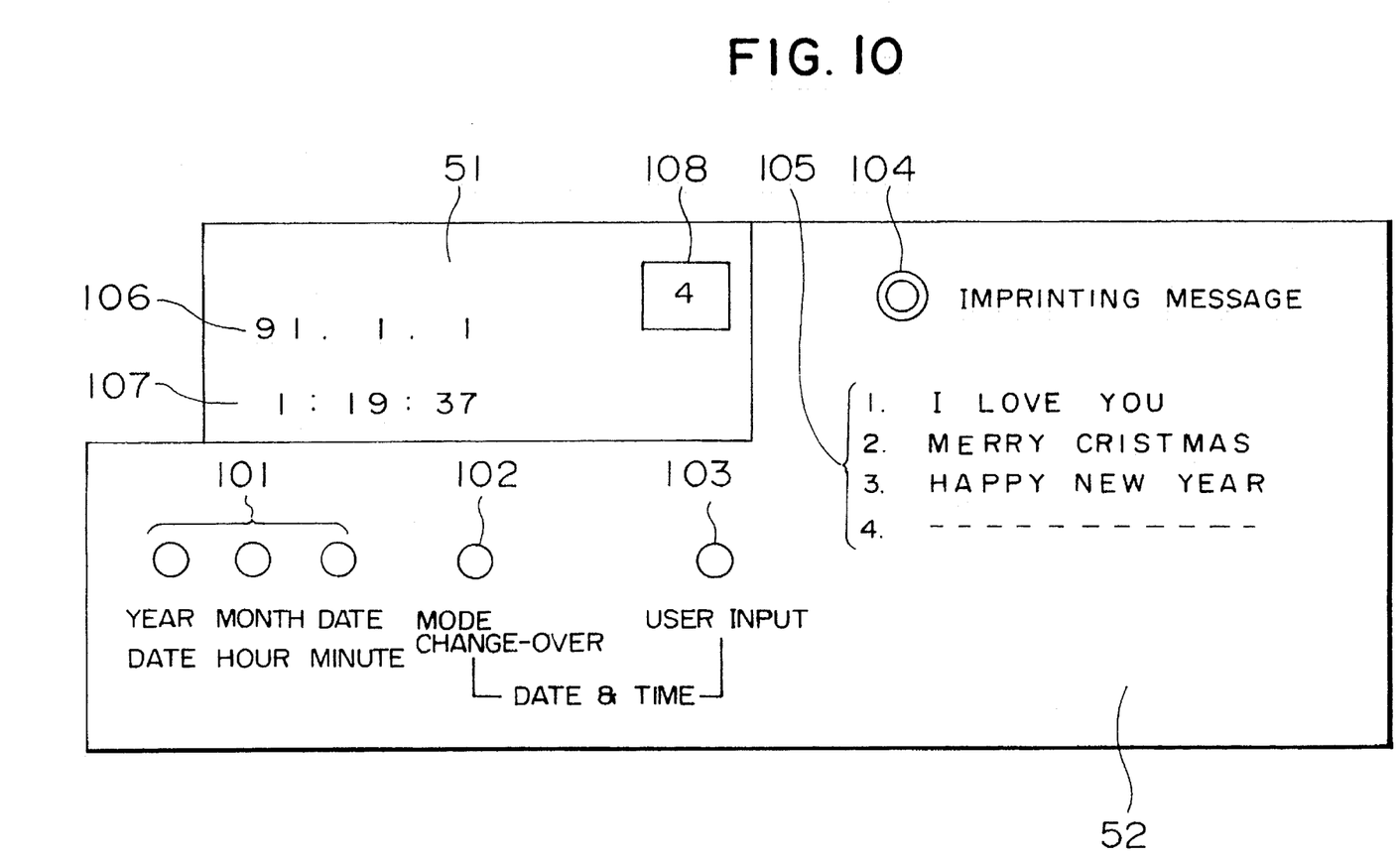
FIG. 10 is a plane view of the LCD and the input operation button panel showing a case where both a date and a time are set as imprinting data in relation to the camera of the preferred embodiment.

In addition, when the user input button 103 and the mode change button 102 are pressed simultaneously, the date data which is being selected by the mode change button 103 is displayed on the display portion 106, and the date data which is not being selected by the same (that is time data because the time mode is not selected in FIG. 6) is displayed on the display portion 107. FIG. 10 shows a display form of LCD 51 in a case where the mode change button 102 and the user input button 103 are both pressed and also "4" is selected by the message selection button 104 (the imprinting messages are off) while the date data is displayed on the display portion 106. In FIG. 10, date data of "91.1.1", time data of "1:19:37" and the imprinting message number of "4" are displayed on the display portion 106, the display portion 107 and the display portion 108, respectively.

As described above, when time data of "1:19:37" is set, "1:19:37" of that momentary time having no "ID" is automatically read as the data inputted voluntarily from the outside of the camera, from clock circuit 20, transformed into magnetic signals and written by magnetic head H on the magnetic memory portion T of the film F after the ID indicating the storing area for the data inputted voluntarily from the outside of the camera by the user, i.e., "EA", during a film transporting operation, while the date data of "91.1.1" is written on the same after "BB".

Figure 11:
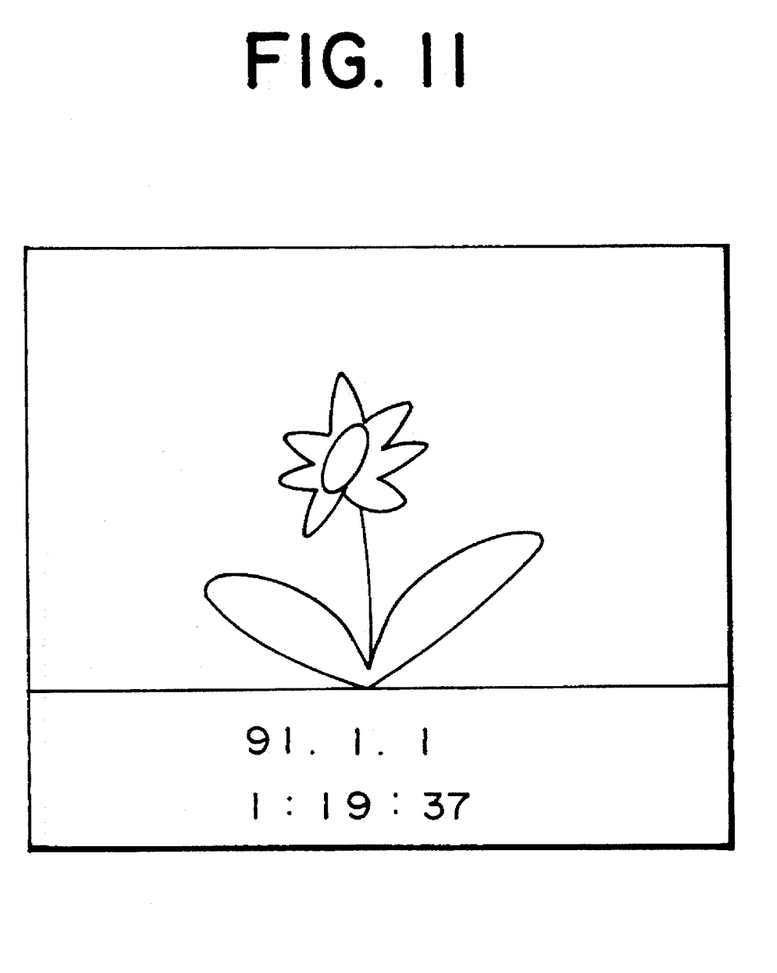
FIG. 11 is a diagram showing a state of a print of a case where the imprinting data shown in FIG. 10 is set.

FIG. 11 is a diagram showing a state of a print of a case where the imprinting data constitute both date and time data as shown in FIG. 10.

The operation of the aforementioned camera will be described below with reference to the flowcharts of FIG. 12 and 13.

[Step 201] It is determined whether an unillustrated back lid switch is on, indicating that the film cartridge C is set in the camera and the back lid is closed. If the back lid switch is on, the process goes to step 202.

[Step 202] The film feeding motor 8 is driven by the film driving circuit 28 to start winding film F (auto-loading).

[Step 203] The film information pertaining to the film speed, the specified number of film frames, the kind of the film F, etc. which is written in the data cells with the IDs indicating the stored areas for them on the magnetic memory portion T of the film F, is read out by the magnetic head H.

This read-out film information is amplified and converted into digital data by the head amplifier 25, transferred to the buffer 27, decoded by the decoder 26 and transferred to the control circuit 19.

[Step 204] The number of the transported frames is counted to determine whether the first frame to be photographed has reached the specific position (aperture position). If the frame reaches the specific position, the process goes to step 205.

[Step 205] Driving of the film transporting motor 8 is stopped to stop winding film F.

[Step 206] The number selected by message selection button 104 (the imprinting message) and the characters entered voluntarily by button 109 in voluntary input operation panel 53 are inputted. The characters entered voluntarily are first stored in EEPROM 29.

[Step 207] The respective imprinting character data inputted as described above are displayed on the LCD 51 together with the date data (date or time data) inputted from the clock circuit 20 as shown in FIG. 6.

[step 208] It is determined whether the switch SW1 is on. If the switch SW1 is on, the process goes to step 209.

[Step 209] The photometry sensor 4 and the distance measuring sensor 6a are driven to obtain photometry and object distance measuring information.

[Step 210] The characters entered voluntarily by the user (which are read from the aforementioned EEPROM 29), the imprinting message corresponding to the number selected by message selection button 104 (which is read from a table of the RAM 22 wherein the messages are stored in advance) or data of the object distance obtained through the aforementioned distance measuring operation are converted into fixed signals and transferred to the encoder 23. The encoder 23 codes the transferred signals and the buffer 24 stores them.

[Step 211] It is determined whether the switch SW2 is on. If it is on, the process goes to step 212.

[Step 212] A well-known exposure operation is performed; that is, control circuit 10 takes in lens position signals through the lens actuator 2a from the lens encoder 2b and instructs the lens actuator 2a to stop when photographic lens reaches a position corresponding to the object distance data obtained in the step 209 to stop the driving of the photographic lens 1, i.e. to stop the focusing operation. At the almost same time, the shutter 3 is opened and closed for the time determined on the basis of the output from the photometry sensor 4 in the step 209.

[Step 213] The film transporting motor 8 is driven through motor driving circuit 28 to start winding the photographed frame, i.e., one frame winding.

[Step 214] The magnetic head H is driven to write the various kinds of data stored in the buffer 24 as described above through the head amplifier 25 on the magnetic memory portion T of the film F.

At this time, as apparent from the aforementioned discussion, the date or time data is written in after the "ID" indicating the date data storing area ("BB") by the magnetic head H, and the object distance data is written in after the "ID" indicating the object distance storing area ("CN"). And also "HAPPY NEW YEAR" or "1:19:37" of the data having no "ID" is automatically regarded as the data inputted (set) voluntarily from the outside of the camera by the user and written in after the "ID" indicating the storing area for the data inputted voluntarily from the outside of the camera by the user ("EA") together with "IN AMERICA" of the data inputted voluntarily from the outside of the camera by the magnetic head H in such a manner as to be "HAPPY NEW YEAR—start a new line—IN AMERICA" as described above.

[Step 215] It is determined whether the winding of the exposed frame is completed on the basis of the output of the photoreflector 7. If it is completed, the process goes to step 216.

[Step 216] It is determined whether an unexposed frame of the film F (the rest of frames of the film F) exist on the basis of the specified film number of frames read out in the step 203. If there are unexposed frames, the process returns to the step 206 in FIG. 11 so as to prepare for the next photographic operation. If there are no remaining unexposed frames, the process goes to step 217.

[Step 217] The film transporting motor 8 is driven in the opposite direction of the aforementioned direction through motor driving circuit 28 to keep rewinding the film F until the continuous outputs from the photoreflector 7 do not exist, i.e., the leader portion of the film F passes the position of the photoreflector 7.

Thus, the rewinding of the film F is completed in such a manner that only the leader portion of the film F is outside of the film cartridge C.

The process is thereby completed.

Although not described above, pad 11 is arranged to be pressed against the magnetic head H through pad movement control mechanism 12 and to ensure the reading-out and writing-in of the magnetic information.

The individual components shown in outline or designated by blocks in the Drawings are all well-known in the camera and recording arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera using a film with a magnetic memory portion, comprising:

first data setting means for setting data voluntarily set by a user;

recording means for recording the voluntarily set data together with an ID for the voluntarily set data on the magnetic memory portion of the film;

second data setting means for setting predetermined data other than the voluntarily set data; and control means for causing said recording means to record the predetermined data together with the ID for the voluntarily set data on the magnetic memory portion of the film.

2. A camera according to claim 1, wherein said first data setting means comprises means operable from the outside of said camera by the user.

3. A camera according to claim 2, wherein said second data setting means comprises means for setting data other than data having an ID as the predetermined data.

4. A camera according to claim 3, wherein said second data setting means comprises means for automatically setting data as the predetermined data.

5. A camera according to claim 4, wherein said second data setting means comprises means for setting internal data obtained from said camera as the predetermined data.

6. A camera according to claim 1, wherein said second data setting means comprises means for setting data other than data having ID as the predetermined data.

7. A camera according to claim 6, wherein said second data setting means comprises means for automatically setting data as the predetermined data.

8. A camera according to claim 7, wherein said second data setting means comprises means for setting internal data obtained from said camera as the predetermined data.

9. A camera according to claim 1, wherein said second data setting means comprises means for automatically setting data as the predetermined data.

10. A camera according to claim 9, wherein said second data setting means comprises means for setting internal data obtained from said camera as the predetermined data.

11. A camera according to claim 1, wherein said second data setting means comprises means for setting internal data obtained from said camera as the predetermined data.

12. A camera according to claim 1, wherein the ID is arranged to indicate a storing area for the data.

13. A camera according to claim 1, wherein the ID is arranged to indicate a data type.

14. A camera according to claim 1, wherein said recording means comprises a magnetic head.

15. A camera according to claims 1, wherein said second setting date data means comprises means for setting data as the predetermined data.

16. A camera according to claim 1, wherein said second data setting means comprises means for setting time data as the predetermined data.

17. A camera according to claim 1, wherein said second data setting means comprises means for setting prearranged data as the predetermined data.

18. A camera according to claim 1, wherein said second data setting means comprises means for setting prearranged message data as the predetermined data.

19. A camera according to claim 1, wherein said control means comprises means for causing said recording means to record the predetermined data together with the voluntarily set data on the magnetic memory portion of the film.

20. A camera using a recording medium with a memory portion, comprising:

first data setting means for setting data voluntarily set by a user;

recording means for recording the voluntarily set data together with an ID for the voluntarily set data on the memory portion of the recording medium;

second data setting means for setting predetermined data other than the voluntarily set data; and control means for causing said recording means to record the predetermined data together with the ID for the voluntarily set data on the memory portion of the recording medium.

21. A camera according to claim 20, wherein said first data setting means comprises means operable from the outside of said camera by the user.

22. A camera according to claim 21, wherein said second data setting means comprises means for setting data other than data having an ID as the predetermined data.

23. A camera according to claim 22, wherein said second data setting means comprises means for automatically setting data as the predetermined data.

24. A camera according to claim 23, wherein said second data setting means comprises means for setting internal data obtained from said camera as the predetermined data.

25. A camera according to claim 20, wherein said second data setting means comprises means for setting data other than data having an ID as the predetermined data.

26. A camera according to claim 25, wherein said second data setting means comprises means for automatically setting data as the predetermined data.

27. A camera according to claim 26, wherein said second data setting means comprises means for setting internal data obtained from said camera as the predetermined data.

28. A camera according to claim 20, wherein said second data setting means comprises means for automatically setting data as the predetermined data.

29. A camera according to claim 28, wherein said second data setting means comprises means for setting internal data obtained from said camera as the predetermined data.

30. A camera according to claim 20, wherein said second data setting means comprises means for setting internal data obtained from said camera as the predetermined data.

31. A camera according to claim 20, wherein the ID is arranged to indicate a storing area for the data.

32. A camera according to claim 20, wherein the ID is arranged to indicate a data type.

33. A camera according to claim 20, wherein said recording means comprises a recording head.

34. A camera according to claim 20, wherein said second setting means date data comprises means for setting data as the predetermined data.

35. A camera according to claim 20, wherein said second data setting means comprises means for setting time data as the predetermined data.

36. A camera according to claim 20, wherein said second data setting means comprises means for setting prearranged data as the predetermined data.

37. A camera according to claim 20, wherein said second data setting means comprises means for setting prearranged message data as the predetermined data.

38. A camera according to claim 20, wherein said control means comprises means for causing said recording means to record the predetermined data together with the voluntarily set data on the memory portion of the recording medium.

39. An apparatus for a camera using a film with a magnetic memory portion, comprising:
   first data setting means for setting data voluntarily set by a user;
   recording means for recording the voluntarily set data together with an ID for the voluntarily set data on the magnetic memory portion of the film;
   second data setting means for setting predetermined data other than the voluntarily set data; and
   control means for causing said recording means to record the predetermined data together with the ID for the voluntarily set data on the magnetic memory portion of the film.

40. An apparatus according to claim 39, wherein said first data setting means comprises means operable from the outside of said camera by the user.

41. An apparatus according to claims 40, wherein said second data setting means comprises means for setting data other than data having an ID as the predetermined data.

42. An apparatus according to claim 41, wherein said second data setting means comprises means for automatically setting data as the predetermined data.

43. An apparatus according to claim 42, wherein said second data setting means comprises means for setting internal data obtained from said camera as the predetermined data.

44. An apparatus according to claim 39, wherein said second data setting means comprises means for setting data other than data having an ID as the predetermined data.

45. An apparatus according to claim 44, wherein said second data setting means comprises means for automatically setting data as the predetermined data.

46. An apparatus according to claim 45, wherein said second data setting means comprises means for setting internal data obtained from said camera as the predetermined data.

47. An apparatus according to claim 39, wherein said second data setting means comprises means for automatically setting data as the predetermined data.

48. An apparatus according to claim 47, wherein said second data setting means comprises means for setting internal data obtained from said camera as the predetermined data.

49. An apparatus according to claim 39, wherein said second data setting means comprises means for setting internal data obtained from said camera as the predetermined data.

50. An apparatus according to claim 39, wherein the ID is arranged to indicate a storing area for the data.

51. An apparatus according to claim 39, wherein the ID is arranged to indicate a data type.

52. An apparatus according to claim 39, wherein said recording means comprises a magnetic head.

53. An apparatus according to claim 39, wherein said second data setting date data means comprises means for setting data as the predetermined data.

54. An apparatus according to claim 39, wherein said second data setting means comprises means for setting time data as the predetermined data.

55. An apparatus according to claim 39, wherein said second data setting means comprises means for setting prearranged data as the predetermined data.

56. An apparatus according to claim 39, wherein said second data setting means comprises means for setting prearranged message data as the predetermined data.

57. An apparatus according to claim 39, wherein said control means comprises means for causing said recording means to record the predetermined data together with the voluntarily set data on the magnetic memory portion of the film.

58. An apparatus for a camera using a recording medium with a memory portion, comprising:
   first data setting means for setting data voluntarily set by a user;
   recording means for recording the voluntarily set data together with an ID for the voluntarily set data on the memory portion of the recording medium;
   second data setting means for setting predetermined data other than the voluntarily set data; and
   control means for causing said recording means to record the predetermined data together with the ID for the voluntarily set data on the memory portion of the recording medium.

59. An apparatus according to claim 58, wherein said first data setting means comprises means operable from the outside of said camera by the user.

60. An apparatus according to claim 58, wherein said second data setting means comprises means for setting data other than data having an ID as the predetermined data.

61. An apparatus according to claim 60, wherein said second data setting means comprises means for automatically setting data as the predetermined data.

62. An apparatus according to claim 61, wherein said second data setting means comprises means for setting internal data obtained from said camera as the predetermined data.

63. An apparatus according to claim 58, wherein said second data setting means comprises means for setting data other than data having an ID as the predetermined data.

64. An apparatus according to claim 63, wherein said second data setting means comprises means for automatically setting data as the predetermined data.

65. An apparatus according to claim 64, wherein said second data setting means comprises means for setting internal data obtained from said camera as the predetermined data.

66. An apparatus according to claim 58, wherein said second data setting means comprises means for automatically setting data as the predetermined data.

67. An apparatus according to claim 66, wherein said second data setting means comprises means for setting internal data obtained from said camera as the predetermined data.

68. An apparatus according to claim 58, wherein said second data setting means comprises means for setting internal data obtained from said camera as the predetermined data.

69. An apparatus according to claim 58, wherein the ID is arranged to indicate a storing area for the data.

70. An apparatus according to claim 58, wherein the ID is arranged to indicate a data type.

71. An apparatus according to claim 58, wherein said recording means comprises a recording head.

72. An apparatus according to claim 58, wherein said second setting date data means comprises means for setting data as the predetermined data.

73. An apparatus according to claim 58, wherein said second data setting means comprises means for setting time data as the predetermined data.

74. An apparatus according to claim 58, wherein said second data setting means comprises means for setting prearranged data as the predetermined data.

75. An apparatus according to claim 58, wherein said second data setting means comprises means for setting prearranged message data as the predetermined data.

76. An apparatus according to claim 58, wherein said control means comprises means for causing said recording means to record the predetermined data together with the voluntarily set data on the memory portion of the recording medium.

77. An apparatus using a film with a magnetic memory portion, comprising:
  first data setting means for setting data voluntarily set by a user;
  recording means for recording the voluntarily set data together with an ID for the voluntarily set data on the magnetic memory portion of the film;
  second data setting means for setting predetermined data other than the voluntarily set data; and
  control means for causing said recording means to record the predetermined data together with the ID for the voluntarily set data on the magnetic memory portion of the film.

78. An apparatus according to claim 77, wherein said first data setting means comprises means operable from the outside of said camera by the user.

79. An apparatus according to claim 78, wherein said second data setting means comprises means for setting data other than data having an ID as the predetermined data.

80. An apparatus according to claim 79, wherein said second data setting means comprises means for automatically setting data as the predetermined data.

81. An apparatus according to claim 80, wherein said second data setting means comprises means for setting internal data obtained from said camera as the predetermined data.

82. An apparatus according to claim 79, wherein said second data setting means comprises means for setting data other than data having an ID as the predetermined data.

83. An apparatus according to claim 82, wherein said second data setting means comprises means for automatically setting data as the predetermined data.

84. An apparatus according to claim 83, wherein said second data setting means comprises means for setting internal data obtained from said camera as the predetermined data.

85. An apparatus according to claim 77, wherein said second data setting means comprises means for automatically setting data as the predetermined data.

86. An apparatus according to claim 85, wherein said second data setting means comprises means for setting internal data obtained from said camera as the predetermined data.

87. An apparatus according to claim 77, wherein said second data setting means comprises means for setting internal data obtained from said camera as the predetermined data.

88. An apparatus according to claim 77, wherein the ID is arranged to indicate a storing area for the data.

89. An apparatus according to claim 77, wherein the ID is arranged to indicate a data type.

90. An apparatus according to claim 77, wherein said recording means comprises a magnetic head.

91. An apparatus according to claim 77, wherein said second data setting means comprises means for setting data as the predetermined data.

92. An apparatus according to claim 77, wherein said second data setting means comprises means for setting time data as the predetermined data.

93. An apparatus according to claim 77, wherein said second data setting means comprises means for setting prearranged data as the predetermined data.

94. An apparatus according to claim 77, wherein said second data setting means comprises means for setting prearranged message data as the predetermined data.

95. An apparatus according to claim 77, wherein said control means comprises means for causing said recording means to record the predetermined data together with the voluntarily set data on the magnetic memory portion of the film.

96. An apparatus using a recording medium with a memory portion, comprising:
  first data setting means for setting data voluntarily set by a user;
  recording means for recording the voluntarily set data together with an ID for the voluntarily set data on the memory portion of the recording medium;
  second data setting means for setting predetermined data other than the voluntarily set data; and
  control means for causing said recording means to record the predetermined data together with the ID for the voluntarily set data on the memory portion of the recording medium.

97. An apparatus according to claim 96, wherein said first data setting means comprises means operable from the outside of said camera by the user.

98. An apparatus according to claim 97, wherein said second data setting means comprises means for setting data other than data having an ID as the predetermined data.

99. An apparatus according to claim 98, wherein said second data setting means comprises means for automatically setting data as the predetermined data.

100. An apparatus according to claim 99, wherein said second data setting means comprises means for setting internal data obtained from said camera as the predetermined data.

101. An apparatus according to claim 96, wherein said second data setting means comprises means for setting data other than data having an ID as the predetermined data.

102. An apparatus according to claim 101, wherein said second data setting means comprises means for automatically setting data as the predetermined data.

103. An apparatus according to claim 102, wherein said second data setting means comprises means for setting internal data obtained from said camera as the predetermined data.

104. An apparatus according to claim 96, wherein said second data setting means comprises means for automatically setting data as the predetermined data.

105. An apparatus according to claim 104, wherein said second data setting means comprises means for setting internal data obtained from said camera as the predetermined data.

106. An apparatus according to claim 96, wherein said second data setting means comprises means for setting internal data obtained from said camera as the predetermined data.

107. An apparatus according to claim 96, wherein the ID is arranged to indicate a storing area for the data.

108. An apparatus according to claim 96, wherein the ID is arranged to indicate a data type.

109. An apparatus according to claim 96, wherein said recording means comprises a recording head.

110. An apparatus according to claim 96, wherein said second data setting means comprises means for setting date data as the predetermined data.

111. An apparatus according to claim 96, wherein said second data setting means comprises means for setting time data as the predetermined data.

112. An apparatus according to claim 96, wherein said second data setting means comprises means for setting prearranged data as the predetermined data.

113. An apparatus according to claim 96, wherein said second data setting means comprises means for setting prearranged message data as the predetermined data.

114. An apparatus according to claim 96, wherein said control means comprises means for causing said recording means to record the predetermined data together with the voluntarily set data on the memory portion of the recording medium.

* * * * *

UNITED STATES PATENT AND TRADEMARK OFFICE
CERTIFICATE OF CORRECTION

PATENT NO. : 5,479,228
DATED : December 26, 1995
INVENTOR(S) : Hideo TAMAMURA, et al.

It is certified that error appears in the above-indentified patent and that said Letters Patent is hereby corrected as shown below:

COLUMN 1:

Line 44, "are" should read --is--.

Figure 12:
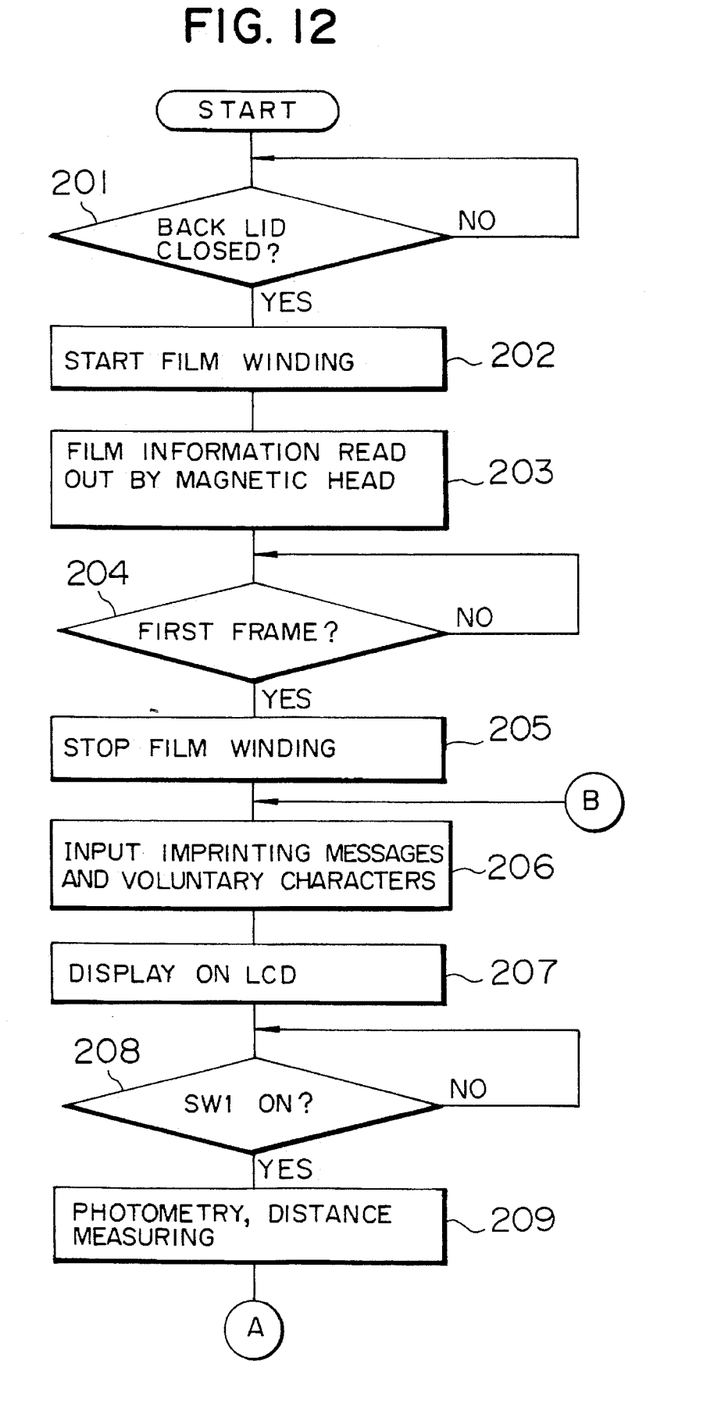
FIG. 12 is a flowchart showing a first part of the operation of the control circuit shown in FIG. 3.
Figure 13:
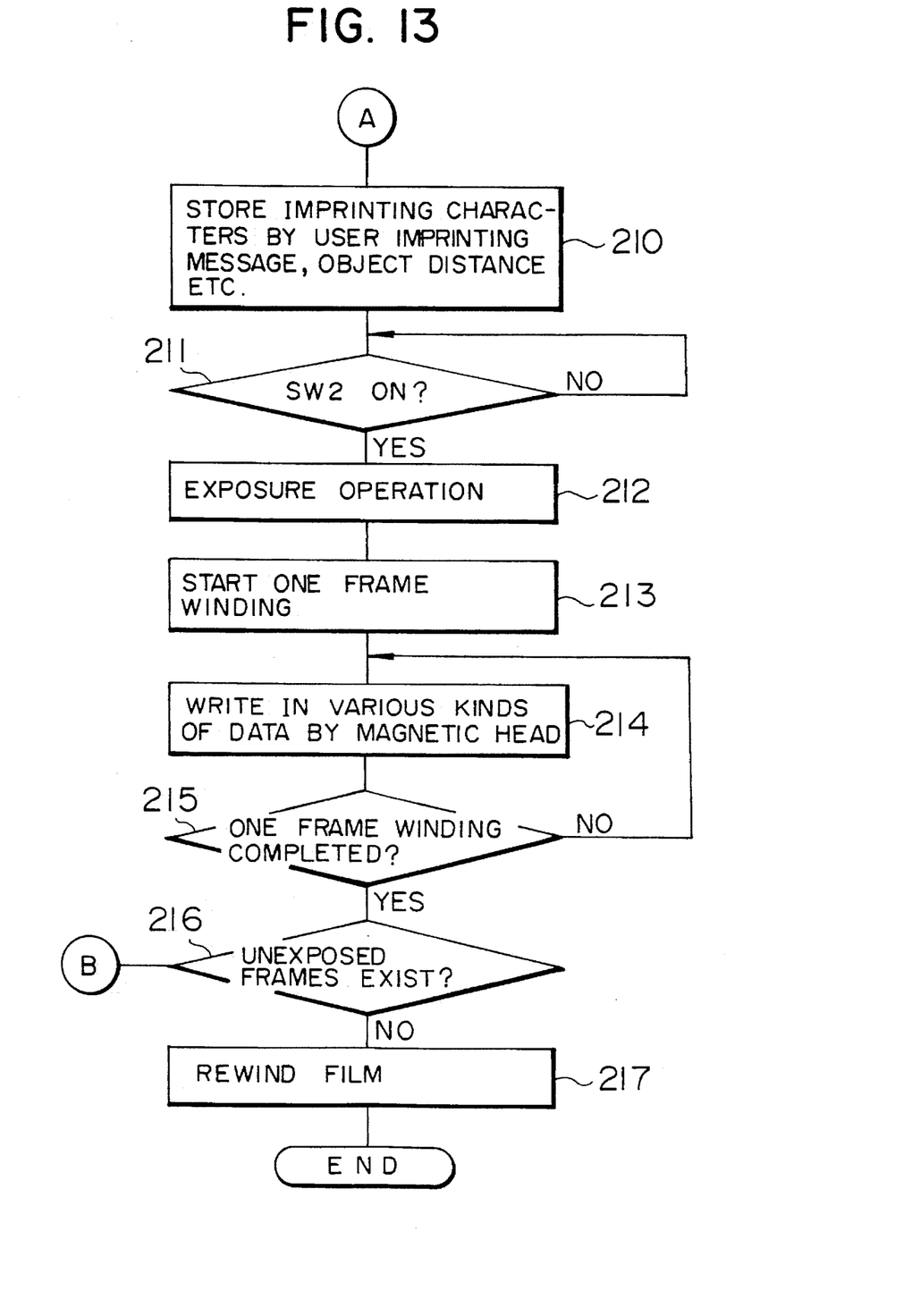
FIG. 13 is a flowchart continued from FIG. 12 showing a second part of the operation of the control circuit shown in FIG. 3.

COLUMN 7:

Line 9, "FIG. 11" should read --FIG. 12--.

COLUMN 8:

Line 3, "having ID" should read --having an ID--; and,
Line 25, "data" should read --date data--.

COLUMN 9:

Line 22, "setting means date data" should read --data setting means-- and "data" (second occurrence) should read --date data--.

UNITED STATES PATENT AND TRADEMARK OFFICE
CERTIFICATE OF CORRECTION

PATENT NO. : 5,479,228
DATED : December 26, 1995
INVENTOR(S) : Hideo TAMAMURA, et al.

It is certified that error appears in the above-indentified patent and that said Letters Patent is hereby corrected as shown below:

COLUMN 10:

Line 22, "date data" should be deleted.

COLUMN 11:

Line 25, "setting date data" should read --data setting--; and,
Line 26, "data" should read --date data--.

COLUMN 12:

Line 1, "claim 79," should read --claim 77,--; and,
Line 29, "data" second occurrence) should read --date data--.

Signed and Sealed this

Fourth Day of June, 1996

Attest:

BRUCE LEHMAN

Attesting Officer            Commissioner of Patents and Trademarks